United States Patent
Perdue et al.

[11] Patent Number: 5,841,666
[45] Date of Patent: Nov. 24, 1998

[54] PROCESSOR APPARATUS AND METHOD FOR A PROCESS MEASUREMENT SIGNAL

[75] Inventors: Kenneth L. Perdue, Franklin; Gerd Wartmann; Donald D. Cummings, both of Greenwood, all of Ind.

[73] Assignee: Endress + Hauser GmbH + Co., Maulburg, Germany

[21] Appl. No.: 576,554

[22] Filed: Dec. 21, 1995

[51] Int. Cl.⁶ .................................................. G10K 11/00
[52] U.S. Cl. ................ 364/551.01; 364/550; 340/854.6; 340/855.4; 356/445; 356/229
[58] Field of Search .............................. 364/550, 551.01, 364/561, 569; 356/445, 229, 254; 340/854.6, 855.4, 855.6, 856.4

[56] References Cited

U.S. PATENT DOCUMENTS

| | | |
|---|---|---|
| 3,832,900 | 9/1974 | Ross . |
| 3,922,914 | 12/1975 | Fuchs . |
| 3,995,212 | 11/1976 | Ross . |
| 4,135,397 | 1/1979 | Krake . |
| 4,322,832 | 3/1982 | Sartorius . |
| 4,713,538 | 12/1987 | Theocharous ...................... 250/227.23 |
| 5,122,800 | 6/1992 | Philipp .................................... 341/156 |
| 5,323,361 | 6/1994 | Elle et al. . |
| 5,345,471 | 9/1994 | McEwan . |
| 5,361,070 | 11/1994 | McEwan . |
| 5,376,888 | 12/1994 | Hook . |
| 5,391,839 | 2/1995 | Lang et al. . |
| 5,420,517 | 5/1995 | Skaling et al. . |

FOREIGN PATENT DOCUMENTS

| | | |
|---|---|---|
| 0 260 113 | 3/1988 | European Pat. Off. . |
| 27 44 862 | 4/1979 | Germany . |
| 33 37 690 | 4/1985 | Germany . |
| 42 04 414 | 6/1993 | Germany . |
| 43 08 373 | 9/1994 | Germany . |
| 2 064 128 | 6/1981 | United Kingdom . |
| 1 599 695 | 10/1981 | United Kingdom . |
| 2 079 950 | 1/1982 | United Kingdom . |

OTHER PUBLICATIONS

Steven Arcone, "Conductivity limitations in single–reflection time–domain reflectometry", J. Phys. E. Sci. Instrum. 19 (1986), pp. 1067–1069.

*Primary Examiner*—Thomas Peeso
*Attorney, Agent, or Firm*—Bose McKinney & Evans

[57] ABSTRACT

An apparatus and method for processing a time domain reflectometry (TDR) signal to generate an output result corresponding to a valid process variable. The method includes the steps of processing the TDR signal using at least two different techniques for detecting a valid reflection pulse generated by the process variable to calculate an independent result using each of the at least two techniques, and applying a weighted factor to the independent results from each of the at least two different techniques to provide weighted output results. The method also includes the steps of comparing the weighted output results, and selecting the valid output result from the weighted output results based on the comparing step. In the illustrated method, the comparing step includes the step of summing the weighted factors for each independent result.

24 Claims, 8 Drawing Sheets

PROCESSOR APPARATUS AND METHOD FOR A PROCESS MEASUREMENT SIGNAL

BACKGROUND AND SUMMARY OF THE INVENTION

The present invention relates to a processor apparatus and method for a process measurement signal. More particularly, the present invention relates to an improved processor for time-of-flight signals to provide an accurate indication of the location of an interface between a first medium and a second medium in a vessel.

The process and storage industries have long used various types of equipment to measure process parameters such as level, flow, temperature, etc. A number of different techniques (such as mechanical, capacitance, ultrasonic, hydrostatic, etc.) provide measurement solutions for many applications. However, many other applications remain for which no available technology can provide a solution, or which cannot provide such a solution at a reasonable cost. For many applications that could benefit from a level measurement system, currently available level measurement systems are too expensive.

In certain applications, such as high volume petroleum storage, the value of the measured materials is high enough to justify high cost level measurement systems which are required for the extreme accuracy needed. Such expensive measurement systems can include a servo tank gauging system or a frequency modulated continuous wave radar system.

Further, there are many applications that exist where the need to measure level of the product is high in order to maintain product quality, conserve resources, improve safety, etc. However, lower cost measurement systems are needed in order to allow a plant to instrument its measurements fully.

There are certain process measurement applications that demand other than conventional measurement approaches. For example, applications demanding high temperature and high pressure capabilities during level measurements must typically rely on capacitance measurement. However, conventional capacitance measurement systems are vulnerable to errors induced by changing material characteristics. Further, the inherent nature of capacitance measurement techniques prevents the use of such capacitance level measurement techniques in vessels containing more than more one fluid layer.

Ultrasonic time-of-flight technology has reduced concerns regarding level indications changing as material characteristics change. However, ultrasonic level measurement sensors cannot work under high temperatures, high pressures, or in vacuums. In addition, such ultrasonic sensors have a low tolerance for acoustic noise.

One technological approach to solving these problems is the use of guided wave pulses. These pulses are transmitted down a dual probe transmission line into the stored material, and are reflected from probe impedance changes which correlate with the fluid level. Process electronics then convert the time-of-flight signals into a meaningful fluid level reading. Conventional guided wave pulse of techniques are very expensive due to the nature of equipment needed to produce high-quality, short pulses and to measure the time-of-flight for such short time events. Further, such probes are not a simple construction and are expensive to produce compared to simple capacitance level probes.

Recent developments by the National Laboratory System now make it possible to generate fast, low power pulses, and to time their return with very inexpensive circuits. See, for example, U.S. Pat. Nos. 5,345,471 and 5,361,070. However, this new technology alone will not permit proliferation of level measurement technology into process and storage measurement applications. The pulses generated by this new technology are broadband, and also are not square wave pulses. In addition, the generated pulses have a very low power level. Such pulses are at a frequency of 100 MHz or higher, and have an average power level of about 1 nW or lower. These factors present new problems that must be overcome to transmit the pulses down a probe and back and to process and interpret the returned pulses.

First, a sensor apparatus must be provided for transmitting these low power, high frequency pulses down a probe and effecting their return. Such an appropriate sensor apparatus is described in copending U.S. patent application Ser. No. 08/574,818, entitled SENSOR APPARATUS FOR PROCESS MEASUREMENT, filed Dec. 19, 1995, the disclosure of which is hereby expressly incorporated by reference into the present application.

The sensor apparatus is particularly adapted for the measurement of material levels in process vessels and storage vessels, but is not limited thereto. It is understood that the sensor apparatus may be used for measurement of other process variables such as flow, composition, dielectric constant, moisture content, etc. In the specification and claims, the term "vessel" refers to pipes, chutes, bins, tanks, reservoirs or any other storage vessels. Such storage vessels may also include fuel tanks, and a host of automotive or vehicular fluid storage systems or reservoirs for engine oil, hydraulic fluids, brake fluids, wiper fluids, coolant, power steering fluid, transmission fluid, and fuel.

The present invention propagates electromagnetic energy down an inexpensive, single conductor transmission line as an alternative to conventional coax cable or dual transmission lines. The Goubau line lends itself to applications for a level measurement sensor where an economical rod or cable probe (i.e., a one conductor instead of a twin or dual conductor approach) is desired. The single conductor approach enables not only taking advantage of new pulse generation and detection technologies, but also constructing probes in a manner similar to economical capacitance level probes.

The present invention specifically relates to a signal processor apparatus for processing and interpreting the returned pulses from the conductor. Due to the low power, broadband pulses used in accordance with the present invention, such signal processing to provide a meaningful indication of the process variable is difficult. Conventional signal processing techniques use only simple peak detection to monitor reflections of the pulses.

The present invention provides signal processing circuitry configured for measurement of the time-of-flight of very fast, guided wave pulses. Techniques used in similar processes, such as ultrasonic level measurement are vastly different from and are insufficient for detection of guided electromagnetic wave pulses due to the differences in signal characteristics. For example, ultrasonic signals are much noisier and have large dynamic ranges of about 120 dB and higher. Guided electromagnetic waves in this context are low in noise and have low dynamic ranges (less than 10:1) compared to the ultrasonic signals, and are modified by environmental impedances. The signal processor of the present invention is configured to determine an appropriate reflection pulse of these low power signals from surrounding environmental influences.

Standard electromagnetic reflection measurements are known as time domain reflectometry (TDR). TDR devices for level measurement require the measuring of the time of flight of a transit pulse and a subsequently produced reflective pulse received at the launching site of the transit pulse. This measurement is typically accomplished by determining the time interval between the maximum amplitude of the transmitted or launched pulse and the maximum amplitude of the received pulse. The determination of this time interval is done by counting the interval between the transmitted pulse and the received pulse.

The present invention provides an improved signal processor for determining a valid reflective pulse signal caused by an interface of material in contact with a probe element of a sensor apparatus. The processor apparatus of the present invention is particularly useful for processing high speed, low power pulses as discussed above. In the preferred embodiment of the signal processor apparatus, processing is performed based on a digital sampling of an analog output of the reflective pulses. It is understood, however, that similar signal processing techniques can be used on the analog signal in real time.

According to one aspect of the present invention, a method is provided for processing a time domain reflectometry (TDR) signal to generate an output result corresponding to a valid process variable. The method includes the steps of processing the TDR signal using at least two different techniques for detecting a valid reflection pulse generated by the process variable to calculate an independent result using each of the at least two techniques, and applying a weighted factor to the independent results from each of the at least two different techniques to provide weighted output results. The method also includes the steps of comparing the weighted output results, and selecting the valid output result from the weighted output results based on the comparing step. In the illustrated method, the comparing step includes the step of summing the weighted factors for each independent result.

According to another aspect of the present invention, a method is provided for processing a time domain reflectometry (TDR) signal having a plurality of reflection pulses to generate a valid output result corresponding to a reflection pulse caused by a process variable. The method includes the steps of processing the TDR signal using a first method for detecting the reflection pulse generated by the process variable and for calculating a first output result, processing the TDR signal using a second method for detecting the reflection pulse generated by the process variable and for calculating a second output result, and processing the TDR signal using a third method for detecting the reflection pulse generated by the process variable and for calculating a third output result. The method also includes the steps of comparing the first, second, and third results, and selecting the valid output result based on the comparing step.

In the illustrated method, the comparing step includes the step of applying a weighted factor to each of the first, second, and third results prior to the selecting step. The comparing step also includes the step of summing the weighted factors for each of the first, second, and third results.

Also in the illustrated embodiment, the first processing method includes the steps of detecting a maximum value reflection pulse from the plurality of reflection pulses of the TDR signal and calculating the first result based on the maximum value reflection pulse of the TDR signal. The second processing method includes the steps of calculating a derivative of the TDR signal, determining a location of a zero crossing adjacent an absolute maximum value of the derivative TDR signal, and calculating the second result based on said zero crossing. The third processing method includes the steps of establishing an initial boundary reflection signal, determining a baseline signal by subtracting the initial boundary signal from the TDR signal, determining a maximum value reflection pulse of the baseline signal, and calculating the third result based on the maximum value reflection pulse of the baseline signal.

The method further includes the step of processing the TDR signal using a fourth method for detecting the reflection pulse generated by the process variable and for calculating a fourth output result. The comparing step compares the first, second, third, and fourth results. Illustratively, the comparing step includes the step of applying a weighted factor to each of the first, second, third, and fourth results prior to the selecting step. The fourth processing method illustratively includes the steps of calculating a derivative of the baseline signal, determining a time position of a zero crossing adjacent an absolute maximum of the derivative of the baseline signal, and calculating the fourth result based on the zero crossing adjacent the absolute maximum of the derivative of the baseline signal.

According to yet another aspect of the present invention, a method is for processing a time domain reflectometry (TDR) signal having a plurality of reflection pulses to generate a valid output result corresponding to a reflection pulse caused by a process variable in a vessel. The TDR signal is generated by a sensor apparatus. The method includes the steps of establishing an initial boundary signal for the sensor apparatus before the process variable is located in the vessel, and storing the detected initial boundary signal. The method also includes the steps of detecting the TDR signal, detecting a maximum value reflection pulse from the plurality of reflection pulses of the TDR signal, and calculating a first output result based on the maximum value reflection pulse of the TDR signal. The method further includes the steps of calculating a derivative of the TDR signal, determining a location of a zero crossing adjacent an absolute maximum value of the derivative TDR signal, calculating a second output result based on the zero crossing adjacent an absolute maximum value of the derivative TDR signal. The method still further includes the steps of determining a baseline signal by subtracting the initial boundary signal from the TDR signal, determining a maximum value of the baseline signal, and calculating a third output result based on the maximum value of the baseline signal. The method includes the steps of calculating a derivative of the baseline signal, determining a time position of a zero crossing adjacent an absolute maximum of the derivative of the baseline signal, and calculating a fourth output result based on the zero crossing adjacent the absolute maximum of the derivative of the baseline signal. The method also includes the steps of comparing the first, second, third, and fourth output results, and selecting the valid output result from the weighted output results based on the comparing step.

In the illustrated method, the comparing step includes the step of applying weighted factors to the first, second, third, and fourth results to produce weighted results. The comparing step also includes the step of selecting the valid output result from the weighted results.

The illustrated method also includes the step of establishing a new initial boundary reflection signal at a selected time, and storing the new initial boundary signal to update the baseline signal. The comparing step may include the steps of comparing the first, second, and third results to a previous output result, and disregarding a particular result which deviates from the previous output result by more than a selected amount.

According to a further aspect of the present invention, a method is provided for processing a time domain reflectometry (TDR) signal having a plurality of reflection pulses to generate a valid output result corresponding to a reflection pulse caused by a process variable. The method includes the steps of processing the TDR signal using a primary detection method for detecting the reflection pulse generated by the process variable and for calculating a primary output result, and processing the TDR signal using at least one secondary method for detecting the reflection pulse generated by the process variable and for calculating at least one secondary output result. The method also includes the steps of comparing the primary result to the at least one secondary result to check the primary result, and selecting the valid output result based on the comparing step. In the illustrated method, the comparing step includes the step of applying a weighted factor to the primary result and each of the secondary results prior to the selecting step.

According to a still further aspect of the present invention, an apparatus is provided for processing a time domain reflectometry (TDR) signal having a plurality of reflection pulses to generate a valid output result corresponding to a reflection pulse caused by a process variable. The apparatus includes means for processing the TDR signal using a first method for detecting the reflection pulse generated by the process variable and for calculating a first output result, for processing the TDR signal using a second method for detecting the reflection pulse generated by the process variable and for calculating a second output result, and for processing the TDR signal using a third method for detecting the reflection pulse generated by the process variable and for calculating a third output result, means for comparing the first, second, and third results, and means for selecting the valid output result.

In the illustrated embodiment, the apparatus further includes means for processing the TDR signal using a fourth method for detecting the reflection pulse generated by the process variable and for calculating a fourth output result. The comparing means compares the first, second, third, and fourth results. The comparing means illustratively includes means for applying a weighted factor to each of the first, second, third, and fourth results.

According to an additional aspect of the present invention, an apparatus is provided for processing a time domain reflectometry (TDR) signal having a plurality of reflection pulses to generate a valid output result corresponding to a reflection pulse caused by a process variable. The apparatus includes means for processing the TDR signal using a primary detection method for detecting the reflection pulse generated by the process variable and for calculating a primary output result, for processing the TDR signal using at least one secondary method for detecting the reflection pulse generated by the process variable and for calculating at least one secondary output result, for comparing the primary result to the at least one secondary result to check the primary result, and for selecting the valid output result based on the comparison. In the illustrated embodiment, the comparing means includes means for applying a weighted factor to the primary result and each of the secondary results.

Additional objects, features, and advantages of the invention will become apparent to those skilled in the art upon consideration of the following detailed description of the preferred embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF DRAWINGS

Figure 1:
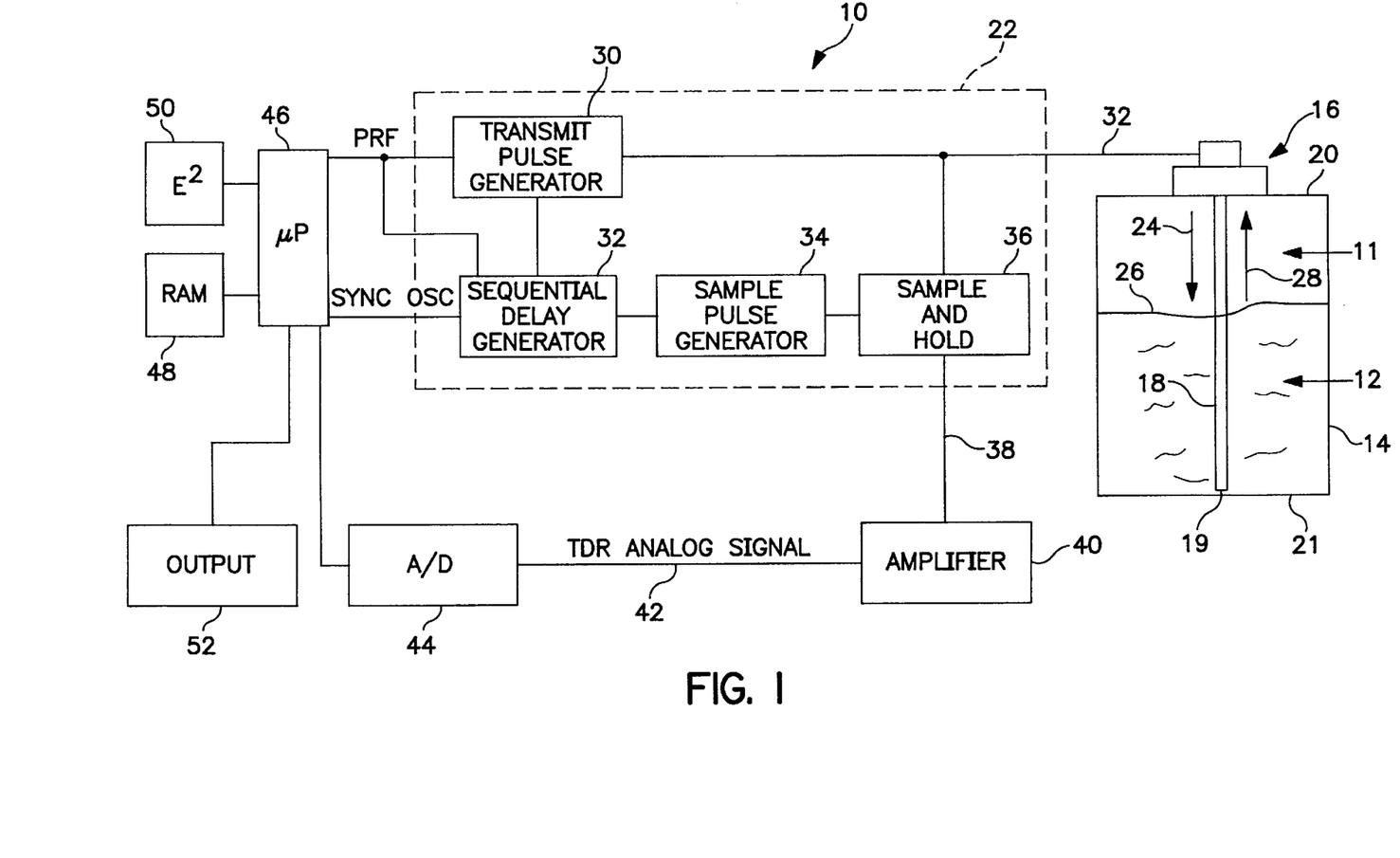
FIG. 1 is a diagrammatical view illustrating a single conductor material level sensor for measuring a level of a process variable such as a liquid in a vessel, and illustrating a block diagram of the pulse transmitter and receiver and the processing circuitry for determining the level of the process variable.

Referring now to the drawings, FIG. 1 provides a diagrammatical illustration of operation of the surface wave transmission line sensor apparatus for process measurement. The apparatus 10 is adapted for use with level measurement of a process variable such as an interface between a first medium 11 and a second medium 12 located within a storage vessel 14. Illustratively, the first medium 11 is air and the second medium 12 is a process variable such as a liquid or other material.

The present invention includes a mechanical mounting apparatus 16 for securing a single conductor transmission line or probe element 18 to a surface 20 of the vessel 14. The mechanical mounting apparatus 16 enables a transceiver 22 to transmit pulses onto the probe element 18 in the direction of arrow 24. Once the pulses reach an interface 26 between the first medium 11 and the second medium 12, such as a top surface of liquid, a reflective pulse is returned back up the probe element 18 in the direction of arrow 28.

The transceiver 22 is coupled to processing circuitry which detects the reflected pulses to interpret the return pulses and to generate an output signal indicating the level of second medium 12 in the vessel 14. Preferably, the transceiver 22 transmits broadband pulses at very low average power levels such as about 1 nW or less, or 1 $\mu$W or less peak power. The frequency of the pulses is preferably about 100 MHz or greater.

The transceiver 22 includes a transmit pulse generator 30 which generates a series of the high frequency pulses and transmits these pulses via a cable 32 to mounting 16. Transceiver 22 also includes a sequential delay generator 32 coupled to the transmit pulse generator 30. A sample pulse generator 34 is coupled to the sequential delay generator 32. A sample and hold buffer 36 is coupled to sample pulse generator 34 and to the cable 32. Illustratively, transceiver 22 is a micropower wide band impulse radar transmitter developed by the Lawrence Livermore National Laboratory located at the University of California located in Livermore, Calif. It is understood, however, that other transceivers 22 may also be used with the signal processor apparatus of the present invention.

As discussed above, the mounting apparatus 16 must be specially designed to transmit and receive the low power, high frequency pulses. The above-referenced copending application, the disclosure of which is expressly incorporated by reference, provides a suitable mounting apparatus 16 for transceiver 22. It is understood that the electronics and processing circuitry may be located at a remote mounting location spaced apart from the mounting apparatus 16.

An output from transceiver 22 on line 38 is coupled to an amplifier 40. An output from amplifier 40 provides a TDR analog signal on line 42. Although the preferred embodiment of the present invention uses a digital sampling system and processes digital signals related to the analog output signals, it is understood that a processor apparatus in accordance with the present invention may be built to process the analog signal directly.

In the present invention, an analog-to-digital converter 44 is coupled to amplifier 40. An output of the analog-to-digital converter 44 is coupled to an input of microprocessor 46. In the illustrated embodiment, microprocessor 46 is a MC68HC711E9 microprocessor available from Motorola. It is understood, however, that any other suitable microprocessor may be used in accordance with the present invention. Microprocessor 46 is used to implement both a fast clock and a slow clock. A PRF clock implemented by microprocessor 46, which is a square wave at about 2 MHz, is coupled to transmit pulse generator 30. The microprocessor 46 also implements a sync oscillator, which is illustratively a square wave having a frequency of about 40 Hz. The sync oscillator is coupled to sequential delay generator 32.

Microprocessor 46 is also coupled to RAM 48 and to EEPROM 50. An output terminal of microprocessor 46 is coupled to an output 52. Illustratively, output 52 provides a 4–20 mA output signal to provide an indication of the level of the interface 26 between the first medium 11 and the second medium 12.

The TDR analog signal from amplifier 40 is an equivalent time signal (ETS) of the real time signal traveling on the transmission line system. The ETS is expanded in time by way of digital sampling, thereby enabling the use of conventional hardware for signal conditioning and processing. The signal processor of the present invention provides means for determining a valid pulse reflection, whether in real time or from the ETS. These results allow flexibility to determine information relating to the position of mediums 11 and 12 relative to a top surface 20, a bottom surface 21, a sensor launch plate, or an end 19 of the probe element 18. The process material positional information is derived from signal reflections caused by impedance discontinuities on the transmission line and subsequent signal processing.

The signal responses of a transmission line which includes cable 32, mounting 16, and probe element 18 are dependent upon the inherent transmission design characteristics and impedance changes created by changing boundary conditions. These boundary conditions are used to determine changes in the sensor environment and are directly or indirectly related to the amount or position of the bulk process materials being measured. The impedance of the sensor at a given location can change with variations of the sensor's environment or boundary condition due to interaction of the sensor, its signal, and its surroundings.

Figure 2:
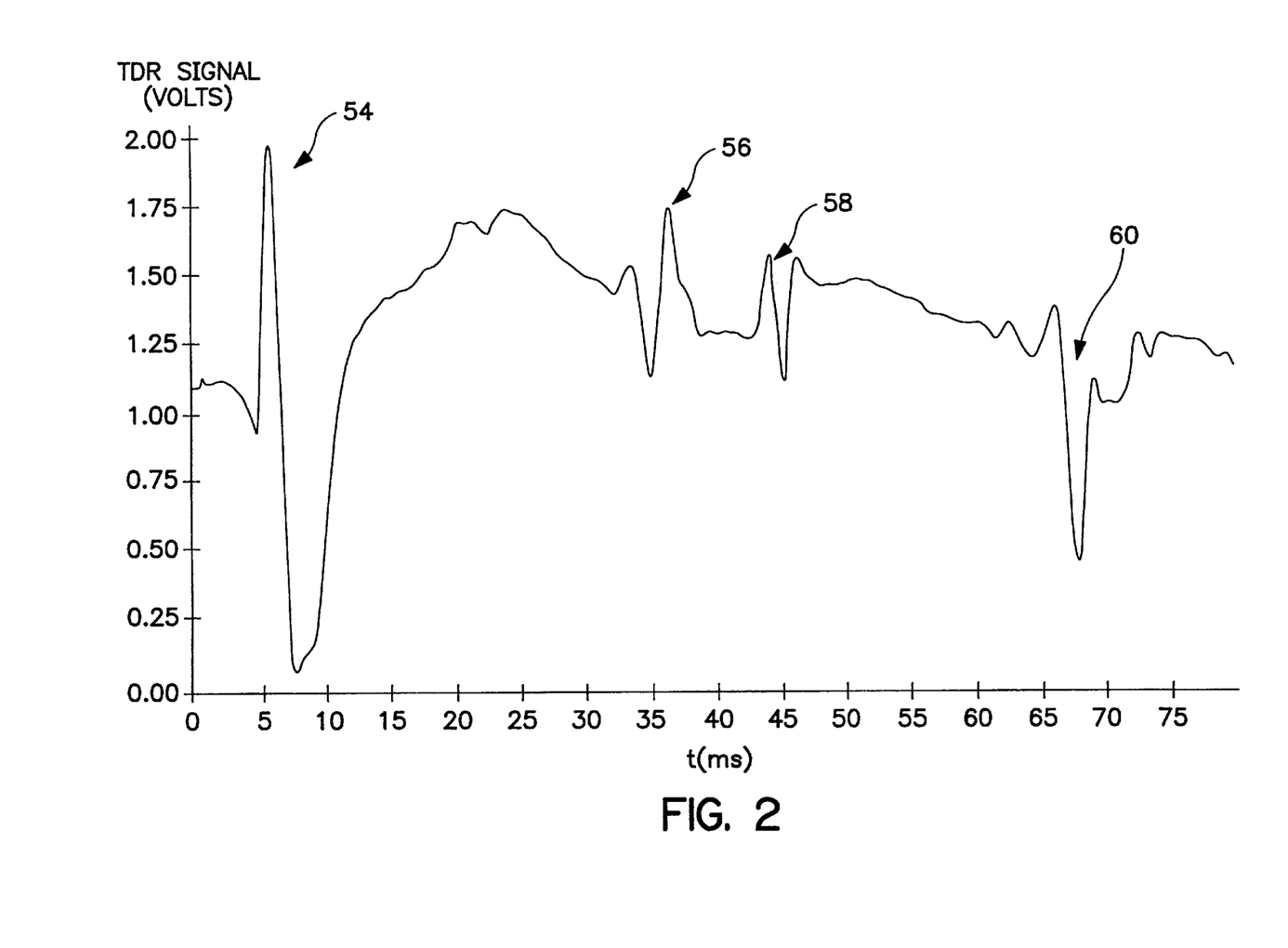
FIG. 2 is an analog signal output of the time domain reflectometry (TDR) signal generated by the transmitter and receiver.

An example of a time domain reflectometry (TDR) analog signal from amplifier 40 is illustrated in FIG. 2. In FIG. 2, the first large voltage fluctuation or pulse 54 is generated by the impedance change in the mounting 16. In the preferred embodiment, the mounting 16 provides this impedance change as a reference reflective pulse. The second reflective pulse 56 in FIG. 2 is generated by an inherent interference within vessel 14. This interference reflection 56 may be caused by a ladder, door, weld seam, material buildup, or other internal factor from vessel 14. The third reflective pulse 58 is provided by the interface 26 between the first medium 11 and the second medium 12. The fourth reflective pulse 60 is generated by an end 19 of probe element 18.

The present invention initializes the signal processing function by characterizing or recording sensor performance at a given time or under known boundary conditions so that this initial characterization can be used as an initial boundary condition. In other words, a reference or initial boundary signal is measured and stored before the first and second mediums 11 and 12 are placed in the vessel 14.

Figure 3:
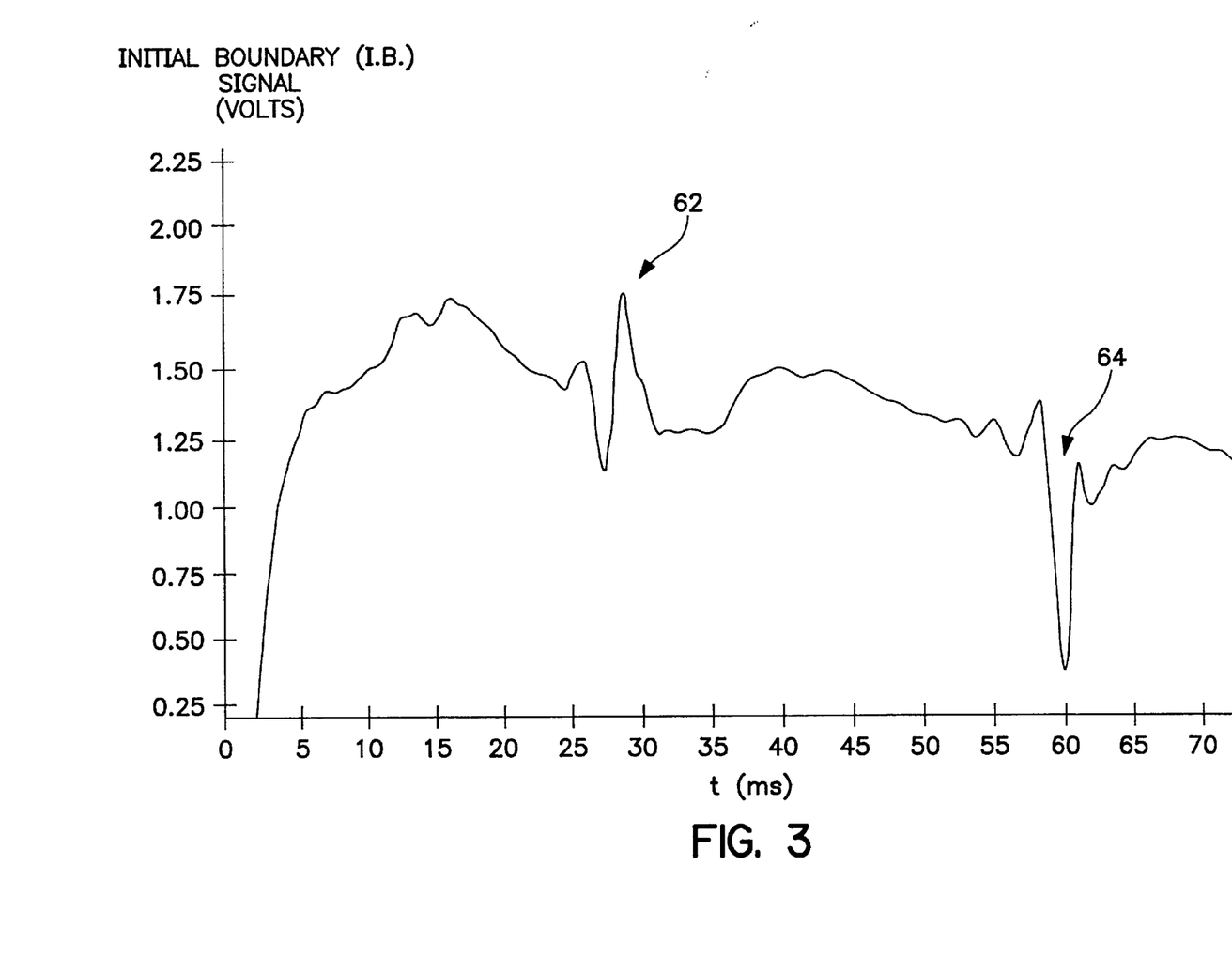
FIG. 3 is an analog output signal indicating an initial boundary condition of the inside of the vessel before the process variable is located in the vessel.

An example of an initial boundary signal (I.B.) is illustrated in FIG. 3. The initial boundary signal is used to help determine a valid impedance change induced reflective pulse caused by interface 26 between first medium 11 and second medium 12. In FIG. 3, the initial voltage peak or reflective pulse 62 is caused by the interference in the vessel 14. Pulse 62 of FIG. 3 corresponds to pulse 56 in FIG. 2. Pulse 64 in FIG. 3 corresponds to the end 19 of probe element 18.

The sensor characterization may include factory calibration, environmental characterization or tank mapping, and sensor recharacterization, or recalibration. The characterization can be done in such a way to permit use of only one or a combination of initialization procedures to provide optimum performance. The characterization of the sensor and its signals inside or outside of its installation environment such as the mounting in the vessel 14 are referred to as its initial boundary conditions.

Factory calibration may include characterizing sensor performance in a stable, known environment which provides a baseline for the system performance while neglecting the influences and effects that are encountered in field installation. A field installation, such as mounting the sensor in a tank or vessel 14, can present an environment for new boundary conditions to the sensor caused by the vessel or permanent contents of the vessel which influence the sensor response due to interaction of the sensor with these vessel contents.

The present invention provides either an automatic recharacterization or a manual recharacterization of the sensor which can be performed to re-establish a new baseline or tank map which enables these environmental changes to be accounted for in determining the valid signal indicating the desired process variable.

A second phase of the signal processor of the present invention involves detecting the pulse reflection produced by a valid signal response of the impedance change along a conductor. In other words, the processor apparatus locates the impedance pulse reflection caused by the interface 26 between the first medium 11 and the second medium 12 in contact with the probe element 18. A number of mathematical techniques can be used to determine the positional information due to impedance changes which generate a signal reflection related in time to the position of the cause of the impedance change along the probe element 18.

Figure 4:
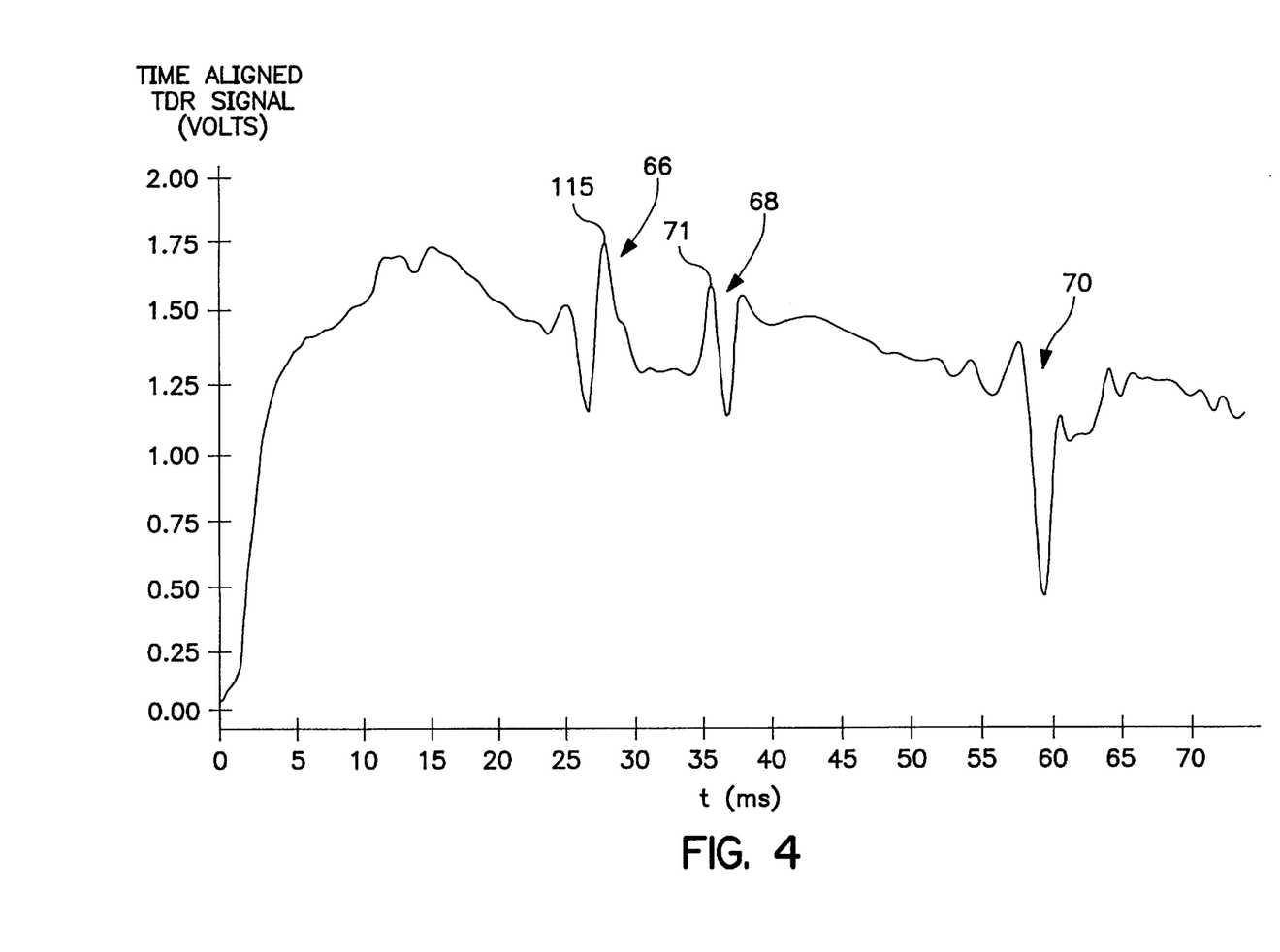
FIG. 4 is a time aligned analog TDR output signal.

Detection of impedance changes may include one or more of the following techniques applied to the TDR analog output signal illustrated in FIG. 2. One detection method is a peak amplitude detection of a Time Aligned TDR signal which is illustrated in FIG. 4. In other words, the signal of FIG. 4 is shifted so that time zero is set as the time of the initial reflecting pulse 54 provided by the impedance change at the mounting 16. In FIG. 4, the first reflection pulse 66 is caused by the interference within vessel 14. Second reflection pulse 68 is caused by interface 26. The third reflection pulse 70 is caused by end 19 of the probe element 18.

Figure 5:
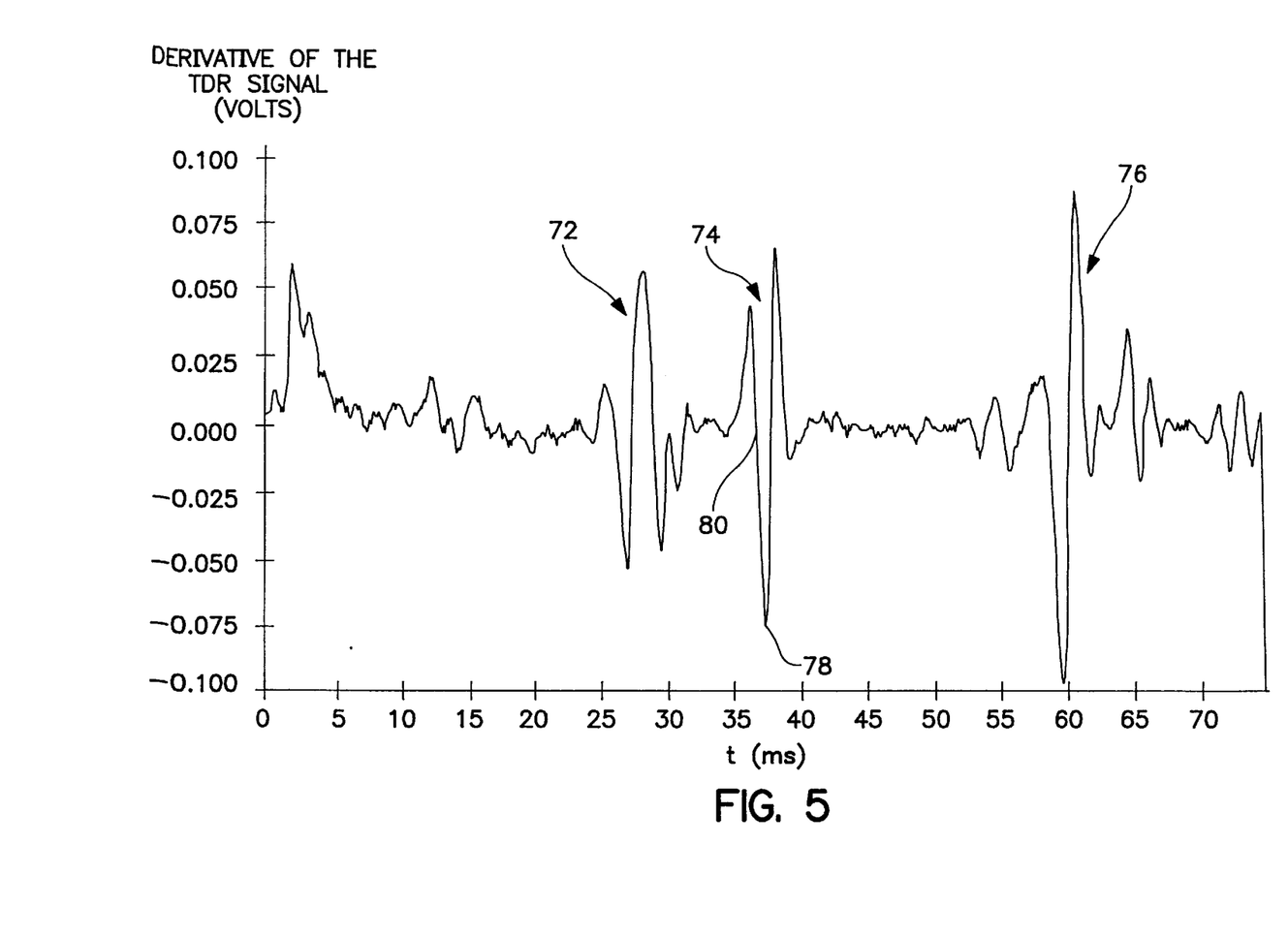
FIG. 5 is an analog derivative signal of the time aligned TDR signal of FIG. 4.

Another detection technique is to determine the first zero crossing after the positive peak of a first derivative signal of the Time Aligned TDR signal of FIG. 4. This derivative signal is illustrated in FIG. 5. Again, the first reflection pulse 72 is caused by the interference within vessel 14. The second reflection pulse 74 is caused by interface 26, and the third reflection pulse 76 is caused by end 19 of probe element 18. Using this technique, the processor apparatus determines the maximum absolute value of the peak reflective pulse, which is illustratively at location 78. If the absolute maximum was a negative value, the preceding zero crossing at location 80 is determined to be the location of interface 26. If the absolute maximum was a positive peak, the next subsequent zero crossing is used as the indication of interface 26.

Figure 6:
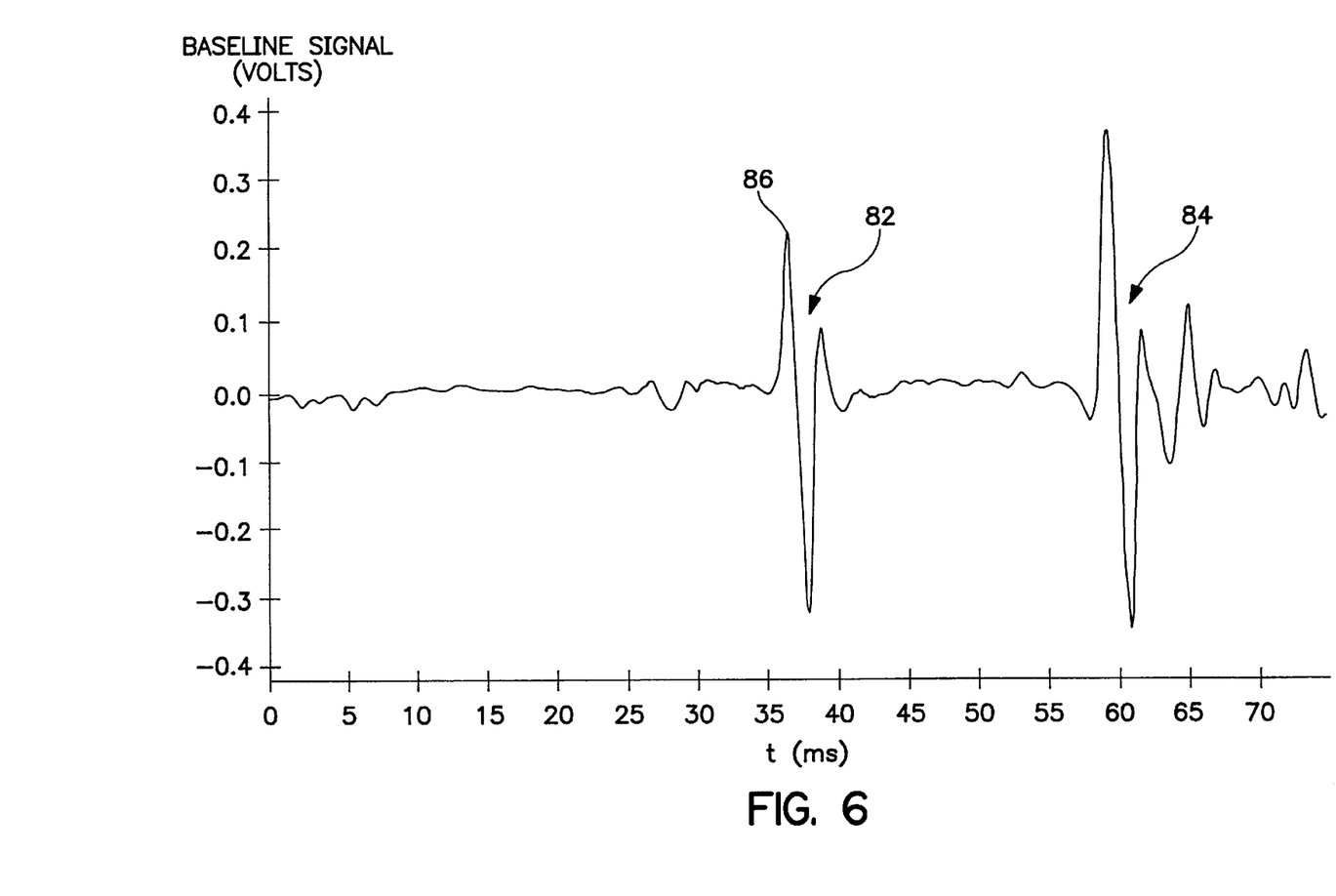
FIG. 6 is an analog baseline signal generated when the initial boundary signal of FIG. 3 is subtracted from the time aligned TDR output signal of FIG. 4.

Yet another technique for determining the valid interface 26 is the use of a baseline signal. The baseline signal is illustrated in FIG. 6. The baseline signal is determined by subtracting the initial boundary signal of FIG. 3 from the Time Aligned TDR signal of FIG. 4. Therefore, the pulse reflection 66 caused by the interference within vessel 14 is cancelled by the initial boundary pulse reflection 62. In FIG. 6, the initial pulse reflection 82 is therefore caused by the interface 26 between the first medium 11 and the second medium 12. Reflective pulse 84 is caused by the end 19 of probe element 18. The processor determines the time of the greatest positive peak 86 as the pulse reflection caused by interface 26.

Figure 7:
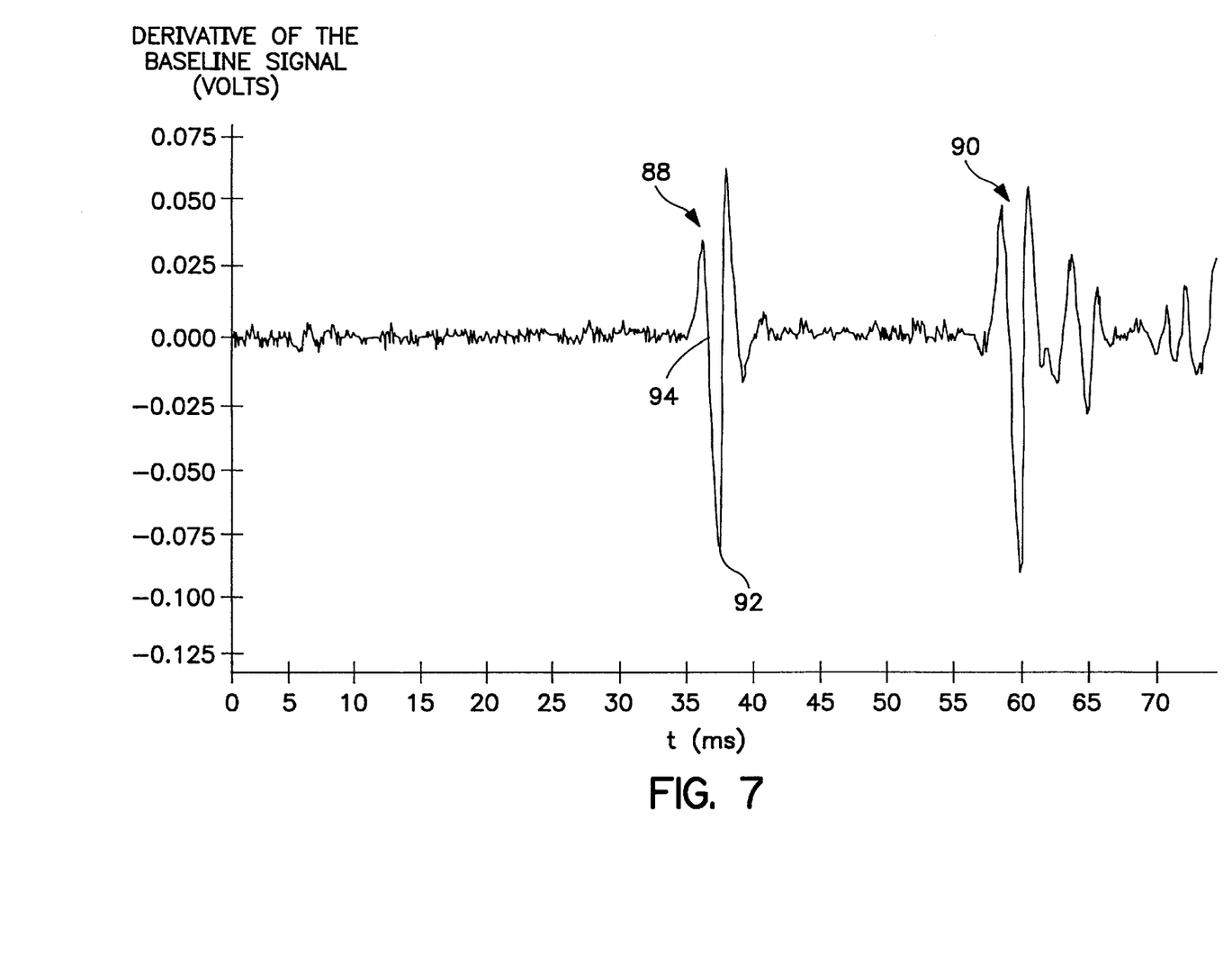
FIG. 7 is an analog signal of a derivative of the baseline signal of FIG. 6.

Still another technique for determining the actual position of interface 26 is to use the first derivative signal of the baseline signal of FIG. 6. The derivative of the baseline signal is illustrated in FIG. 7. Again, the first reflection pulse 88 is caused by the interface 26 between first medium 11 and second medium 12. The second reflection pulse 90 is caused by end 19 of probe element 18. The processor determines the peak absolute value 92 of the pulse reflection 88. Since the peak absolute value is associated with a negative voltage, the processor proceeds to the first proceeding zero crossing 94 as the time for the interface 26. If the maximum absolute value was a positive peak, the next subsequent zero crossing is used as the interface level.

The present invention uses a combination of two or more of the above-cited techniques to verify the data related to the valid detection of interface 26. The short term history of the signal can also be used to substantiate the validity of any change in position of the interface 26 and to verify that this change is possible within the process condition presently being used in the vicinity of the sensor.

In a preferred embodiment of the present invention, the processor determines the location of the valid impedance discontinuity caused by interface 26 between first medium 11 and second medium 12 using each of the four techniques or methods discussed above. Each method is assigned a weighted factor. In the illustrated embodiment, the baseline signal calculation illustrated in FIG. 6 is assigned a weighted factor of 1.1, while the other three techniques are assigned a weighted factor of 1.0. These weighted factors provide means for showing the degree of agreement among the four methods. If the calculated boundary conditions as detected by the sensor creates a conflict among the four detection methods such that there is not a substantial agreement of all four methods, then a valid result is dependent upon whether there is substantial agreement between two or three of the detection methods. If there is substantial deviation in the detection of the valid impedance pulse by all four methods, then the method having the highest weighted factor is used as the valid detection.

Figure 8:
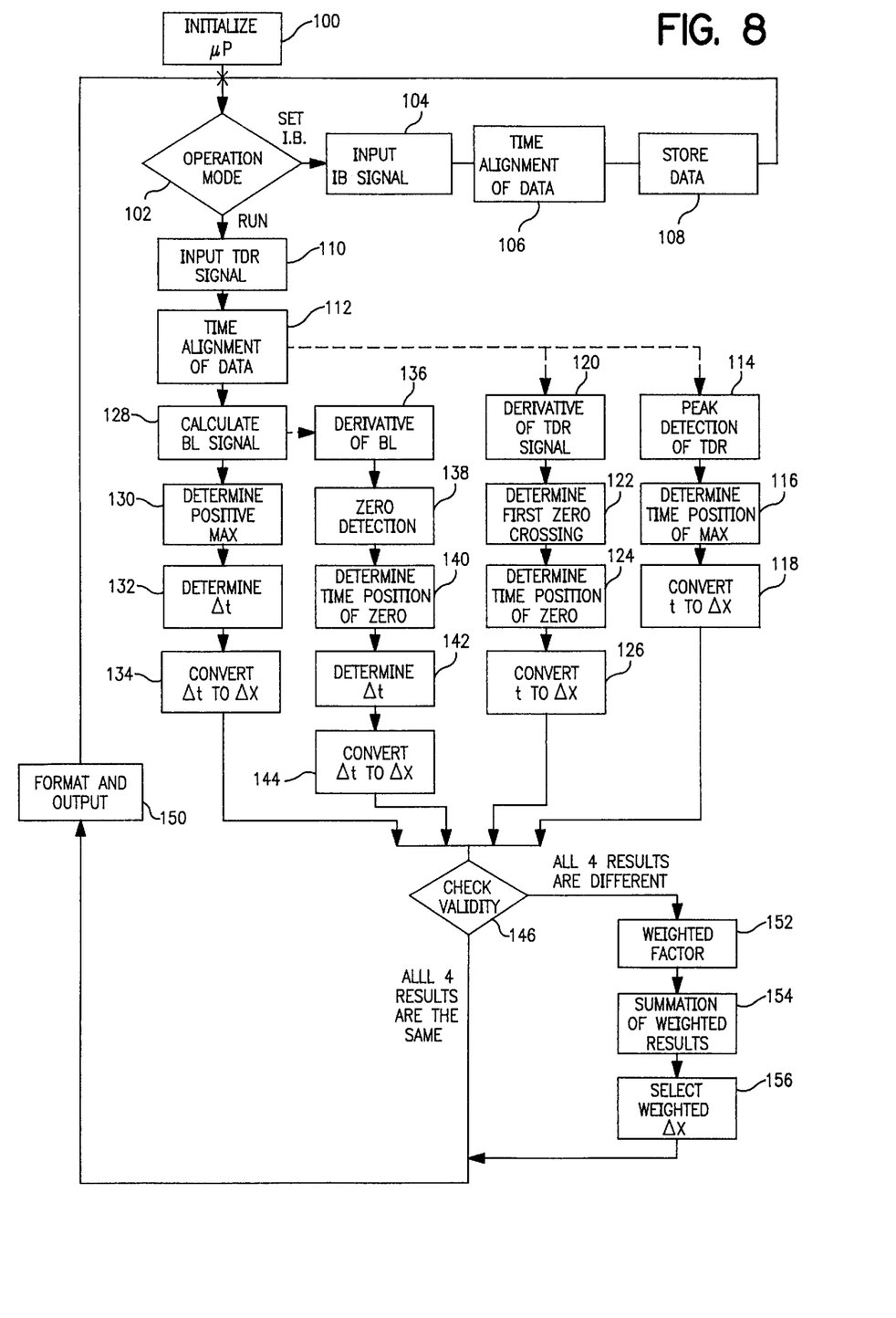
FIG. 8 is a flow chart illustrating the steps performed by the processor apparatus of the present invention to determine an actual, valid level indication of the process variable based on a reflective pulse caused by the process variable.

In the present invention, the microprocessor 46 is programmed with software to calculate the position of the valid impedance change caused by interface 26 using each of the four methods discussed above. FIG. 8 illustrates the steps performed by the microprocessor 46 of the present invention to determine the valid signal. The microprocessor 46 is first initialized as illustrated at block 100. Operation mode of the signal processor is illustrated at block 102.

The first operational mode is to set and store the initial boundary (I.B.) signal illustrated in FIG. 3. This initial boundary signal is generated before the process material is placed in vessel 14. Microprocessor 46 first receives an input initial boundary signal as illustrated at block 104. The data is then time aligned based on the initial impedance change caused by the mounting 16 as illustrated as block 106. Microprocessor 46 then stores the time aligned data related to the initial boundary conditions in the EEPROM 50 as illustrated at block 108. Once the initial boundary signal is stored, microprocessor 46 returns to operation mode at block 102.

In one embodiment, the signal processor of the present invention may establish the initial boundary conditions manually only during initial installation of the sensor apparatus 10 into the vessel 14. In another instance, the initial boundary conditions may be updated at predetermined times during operation of the signal processor.

During normal operation of the signal processor, microprocessor 46 receives an input TDR signal as illustrated at block 110. This input TDR signal is a digital representation from analog-to-digital converter 44 of the TDR analog signal illustrated in FIG. 2. Although reference will be made to the analog signals in FIGS. 2–7, it is understood that the microprocessor 46 of the present invention uses the digital representation of these signals. It is also understood that an analog processor may be used to process the analog signals in accordance with the present invention.

Microprocessor 46 next provides a time alignment of the TDR signal as illustrated at block 112. In other words, microprocessor 46 time shifts the input TDR signal so that the time zero begins at the location of the interface of mounting 16 which is indicated by the initial large reflection pulse 54 shown in FIG. 2.

In the illustrated embodiment, microprocessor 46 uses four different detection methods to locate a valid pulse reflection indicative of the interface 26 between the first medium 11 and the second medium 12. In a first method, microprocessor 46 detects a peak reflection pulse of the time aligned TDR signal (illustrated in FIG. 4) as illustrated in block 114 of FIG. 8. Peak 71 in FIG. 4 is the valid reflection pulse corresponding to interface 26. However, the peak detection step in this example would determine that peak 115 is the valid peak. Peak 115 actually corresponds to interference in vessel 14 to be the valid pulse. This explains why the peak detection method of the time aligned TDR signal, when used alone, may produce some inaccuracies. Microprocessor 46 then determines a time corresponding to the position of the maximum pulse value as illustrated at block 116 in FIG. 8. The time value is then converted to a distance between the top surface 20 of vessel 14 and the interface 26. This step is illustrated at block 118. This distance result calculated using the first detection method is then stored.

It is understood that once a time position of an impedance change on a sensor has been derived, there are a number of techniques that can be used to convert the detected time to a distance equivalent position of the interface 26 of the process variable. The time intervals between the impedance changes has a mathematical relationship such that the time relation between the impedance change is proportional to the speed of light and a continuous function of the relative dielectric constants of the subject materials. If the first medium 11 is air, the dielectric constant is substantially equal to 1.0. The subject time of the interval can then be corrected by applying the continuous functional relation relative to the material dielectric and the environmental surroundings.

Other techniques such as using a sensor or conductor of a known length and then using the relationship changes of the pulse travel times from a subject material interface to an end 19 of the probe element 18. In other words, once the location of the valid impedance pulse is determined, a time or distance between the impedance interface and the end 19 of probe element 18 can be used to determine the level of the interface 26. In the case of a sensor having a known length, differential time intervals from a material interface 26 to end 19 of the probe element 18 changes proportionally with the thickness of the subject material 12 divided by a continuous functional relationship of the material dielectric constant. Provided the probe element 18 has a fixed location relative to the vessel 14, the material level or thickness of the material is an offset relative to sensor position. This positional relationship is determined using simple mathematical equations.

Similarly, the velocity of a pulse traveling on a sensor passing through multiple material layers can be used to determine the level of each material, provided the relative dielectric constant of each material is known. When the sensor has a fixed location relative to vessel 14, the position of each material can be determined as a function of the time differential, with an offset to the sensor position. A sensor can also be designed having markers at known distances to create signal reflections that can be used for calibration and/or determining material dielectric values.

Microprocessor 46 also calculates a derivative of the time aligned TDR signal as illustrated at block 120. An analog representation of this derivative signal is illustrated in FIG. 5. Microprocessor 46 then determines the location of a first zero crossing adjacent an absolute maximum value of the signal. If the maximum is obtained from a positive value, microprocessor 46 determines the next subsequent zero crossing after the positive peak. If the absolute maximum was obtained from a negative value, the microprocessor 46 determines the first zero crossing prior to the detected absolute maximum. This step is illustrated at block 122. Microprocessor 46 then determines a time value corresponding to the detected zero crossing as illustrated at block 124. This time value is then converted to a distance corresponding to the level of the interface 26 between first medium 11 and second medium 12 as illustrated at block 126. This distance calculated using the second detection Method is then stored.

In the third detection method, the microprocessor 46 calculates a baseline (BL) signal by subtracting the initial boundary signal stored in EEPROM 50 (FIG. 3) from the time aligned TDR signal which is illustrated in analog form in FIG. 4 as illustrated at block 128. This baseline signal is illustrated in analog form in FIG. 6. Microprocessor 46 then determines a location of the positive maximum value of the baseline signal as illustrated at block 130. This positive maximum value is illustrated at location 86 in FIG. 6. Microprocessor 46 next determines the time value corresponding to the detected positive maximum value as illustrated at block 132. Microprocessor 46 then converts the time value to a distance change indicating the location of interface 26 between the first medium 11 and second medium 12 as illustrated at block 134. This distance calculated using the third detection method is then stored.

In the fourth detection method, microprocessor 46 generates a first derivative of the baseline signal as illustrated at block 136. An analog representation of the first derivative of the baseline signal is illustrated in FIG. 7. Microprocessor 46 then determines a location of a zero crossing adjacent an absolute maximum value as illustrated at block 138. If the absolute maximum comes from a positive value, the next subsequent zero crossing is used. If the absolute maximum is from a negative value, the first preceding zero crossing is used as a location of interface 26. Microprocessor 46 then determines the time position of the zero crossing at block 140. In the FIG. 7 example, the first preceding zero crossing 94 adjacent negative peak 92 is used as the time position. Microprocessor 46 then determines the time change as illustrated at block 142. This time change is then converted to a distance change as illustrated at block 144 to provide an indication of the level of the interface 26 between the first medium 11 and second medium 12. This distance change calculated using the fourth detection method is then stored.

Microprocessor 46 next checks the validity of the detected distances from each of the four methods discussed above as illustrated at block 146. Each of the distance changes is rounded to a predetermined sensitivity level, for example, one millimeter. If all four stored results from each of the four methods are the same, microprocessor 46 determines that a valid output has been determined. Therefore, microprocessor formats the output into an appropriate form and sends the result to the output 52 as illustrated at block 150.

If the four stored results from the four detection methods are different, microprocessor 46 then takes into account weighted factors established for each of the detection methods as illustrated at block 152. At this point, microprocessor 46 may compare the four stored method results to a previous result. If any of the four stored results deviates from the previous result by more than a predetermined amount, the microprocessor 46 may disregard such a stored result. Microprocessor 46 provides a summation of the weighted results as illustrated at block 154. Examples of this summation by microprocessor 46 are provided below. Microprocessor 46 then selects the most appropriate distance as the valid impedance reflection from interface 26 using the weighted results at block 156. Microprocessor 46 then outputs this selected result at block 150.

Three different examples are provided to illustrate the effect of the weighted factors on the process measurement.

EXAMPLE 1

| Method | X (cm) | W.F. | Selected Result |
|---|---|---|---|
| Peak TDR | 29.0 | 1.0 | |
| Der. TDR | 36.9 | 1.0 | |
| Max. BL | 37.1 | 1.1 | 37.1 |
| Der. BL | 37.3 | 1.0 | |

EXAMPLE 2

| Method | X (cm) | W.F. | Selected Result |
|---|---|---|---|
| Peak TDR | 36.9 | 1.0 | |
| Der. TDR | 37.3 | 1.0 | 37.3 |
| Max. BL | 37.1 | 1.1 | |
| Der. BL | 37.3 | 1.0 | |

EXAMPLE 3

| Method | X (cm) | W.F. | Selected Result |
|---|---|---|---|
| Peak TDR | 37.1 | 1.0 | |
| Der. TDR | 37.3 | 1.0 | |
| Max. BL | 37.1 | 1.1 | 37.1 |
| Der. BL | 37.3 | 1.0 | |

In Example 1, each of the detected results for the level or distance X of the interface 26 is different. In this instance, the greatest weighted factor indicates that the maximum detected baseline value is used. Therefore, the selected result by microprocessor 46 is 37.1 cm.

In Example 2, the maximum baseline method still indicates a distance of 37.1 cm. However, both the derivative of the TDR signal method and the derivative of the baseline signal method provided a result of 37.3 cm. Therefore, the distance of 373 cm has a weighted factor of 2.0 when the two identical results are added together. Distance 36.9 cm from the peak TDR signal method has a weighted factor of 1.0. Distance 37.1 due to the maximum baseline method has a weighted factor of 1.1. Therefore, microprocessor 46 selects the greatest weighted factor of 2.0 and the corresponding distance result of 37.3 cm during the selection step at block 156 in FIG. 8.

In Example 3, both the peak TDR method and the maximum baseline method both provided a distance result of 37.1 cm. The derivative TDR method and the derivative baseline method both produced a result of 37.3 cm. Therefore, the distance 37.1 has a weighted factor of 2.1, while the distance 37.3 cm has a weighted factor of 2.0. Therefore, microprocessor 46 selects the result of 37.1 cm during the selection step at block 156.

It is understood that other detection techniques may be used in accordance with the present invention. In addition, one of the other detection techniques may be applied the highest weighted factor, if desired. In an alternate embodiment, each of the detection techniques may be assigned a different weighted factor. Such weighted factors are selected and applied on the basis of application knowledge and experience.

Although the invention has been described in detail with reference to a certain preferred embodiment, variations and modifications exist within the scope and spirit of the present invention as described and defined in the following claims.

What is claimed is:

1. A method for processing a time domain reflectometry (TDR) signal to generate an output result corresponding to a valid process variable, the method comprising the steps of:
    processing the TDR signal using at least two different techniques for detecting a valid reflection pulse generated by the process variable to calculate an independent result using each of the at least two techniques;
    applying a weighted factor to the independent results from each of the at least two different techniques to provide weighted output results;
    comparing the weighted output results; and
    selecting the valid output result from the weighted output results based on the comparing step.

2. The method of claim 1, wherein the comparing step includes the step of summing the weighted factors for each independent result.

3. A method for processing a time domain reflectometry (TDR) signal having a plurality of reflection pulses to generate a valid output result corresponding to a reflection pulse caused by a process variable, the method comprising the steps of:
    processing the TDR signal using a first method for detecting the reflection pulse generated by the process variable and for calculating a first output result;
    processing the TDR signal using a second method for detecting the reflection pulse generated by the process variable and for calculating a second output result;
    processing the TDR signal using a third method for detecting the reflection pulse generated by the process variable and for calculating a third output result;
    comparing the first, second, and third results; and
    selecting the valid output result based on the comparing step.

4. The method of claim 3, wherein the comparing step includes the step of applying a weighted factor to each of the first, second, and third results prior to the selecting step.

5. The method of claim 4, wherein the comparing step also includes the step of summing the weighted factors for each of the first, second, and third results.

6. The method of claim 3, wherein the first processing method includes the steps of detecting a maximum value reflection pulse from the plurality of reflection pulses of the TDR signal and calculating the first result based on the maximum value reflection pulse of the TDR signal.

7. The method of claim 6, wherein the second processing method includes the steps of calculating a derivative of the TDR signal, determining a location of a zero crossing adjacent an absolute maximum value of the derivative TDR signal, and calculating the second result based on said zero crossing.

8. The method of claim 7, wherein the third processing method includes the steps of establishing an initial boundary reflection signal, determining a baseline signal by subtracting the initial boundary signal from the TDR signal, determining a maximum value reflection pulse of the baseline signal, and calculating the third result based on the maximum value reflection pulse of the baseline signal.

9. The method of claim 8, further comprising the step of calculating a derivative of the baseline signal, determining a time position of a zero crossing adjacent an absolute maximum of the derivative of the baseline signal, and calculating a fourth result based on the zero crossing adjacent the absolute maximum of the derivative of the baseline signal, and wherein the comparing step compares the first, second, third, and fourth results.

10. The method of claim 8, further comprising the step of reestablishing the initial boundary reflection signal at a selected time to update the baseline signal.

11. The method of claim 3, further comprising the step of processing the TDR signal using a fourth method for detecting the reflection pulse generated by the process variable and for calculating a fourth output result, and wherein the comparing step compares the first, second, third, and fourth results.

12. The method of claim 11, wherein the comparing step includes the step of applying a weighted factor to each of the first, second, third, and fourth results prior to the selecting step.

13. The method of claim 3, wherein the comparing step includes the steps of comparing the first, second, and third results to a previous output result, and disregarding a particular result which deviates from the previous output result by more than a selected amount.

14. A method for processing a time domain reflectometry (TDR) signal having a plurality of reflection pulses to generate a valid output result corresponding to a reflection pulse caused by a process variable in a vessel, the TDR being generated by a sensor apparatus, the method comprising the steps of:

establishing an initial boundary signal for the sensor apparatus before the process variable is located in the vessel;

storing the detected initial boundary signal;

detecting the TDR signal;

detecting a maximum value reflection pulse from the plurality of reflection pulses of the TDR signal;

calculating a first output result based on the maximum value reflection pulse of the TDR signal;

calculating a derivative of the TDR signal;

determining a location of a zero crossing adjacent an absolute maximum value of the derivative TDR signal;

calculating a second output result based on the zero crossing adjacent an absolute maximum value of the derivative TDR signal;

determining a baseline signal by subtracting the initial boundary signal from the TDR signal;

determining a maximum value of the baseline signal;

calculating a third output result based on the maximum value of the baseline signal;

calculating a derivative of the baseline signal;

determining a time position of a zero crossing adjacent an absolute maximum of the derivative of the baseline signal;

calculating a fourth output result based on the zero crossing adjacent the absolute maximum of the derivative of the baseline signal;

comparing the first, second, third, and fourth output results; and selecting the valid output result from the weighted output results based on the comparing step.

15. The method of claim 14, wherein the comparing step includes the step of applying weighted factors to the first, second, third, and fourth results to produce weighted results, and selecting the valid output result from the weighted results.

16. The method of claim 14, further comprising the step of establishing a new initial boundary reflection signal at a selected time, and storing the new initial boundary signal to update the baseline signal.

17. A method for processing a time domain reflectometry (TDR) signal having a plurality of reflection pulses to generate a valid output result corresponding to a reflection pulse caused by a process variable, the method comprising the steps of:

processing the TDR signal using a primary detection method for detecting the reflection pulse generated by the process variable and for calculating a primary output result;

processing the TDR signal using at least one secondary method for detecting the reflection pulse generated by the process variable and for calculating at least one secondary output result;

comparing the primary result to the at least one secondary result to check the primary result; and selecting the valid output result based on the comparing step.

18. The method of claim 17, wherein the comparing step includes the step of applying a weighted factor to the primary result and each of the secondary results prior to the selecting step.

19. An apparatus for processing a time domain reflectometry (TDR) signal having a plurality of reflection pulses to generate a valid output result corresponding to a reflection pulse caused by a process variable, the apparatus comprising means for processing the TDR signal using a first method for detecting the reflection pulse generated by the process variable and for calculating a first output result, for processing the TDR signal using a second method for detecting the reflection pulse generated by the process variable and for calculating a second output result, and for processing the TDR signal using a third method for detecting the reflection pulse generated by the process variable and for calculating a third output result, means for comparing the first, second, and third results, and means for selecting the valid output result.

20. The apparatus of claim 19, wherein the comparing means includes means for applying a weighted factor to each of the first, second, and third results.

21. The apparatus of claim 19, further comprising means for processing the TDR signal using a fourth method for detecting the reflection pulse generated by the process variable and for calculating a fourth output result, and wherein the comparing means compares the first, second, third, and fourth results.

22. The method of claim 21, wherein the comparing means includes means for applying a weighted factor to each of the first, second, third, and fourth results.

23. An apparatus for processing a time domain reflectometry (TDR) signal having a plurality of reflection pulses to generate a valid output result corresponding to a reflection pulse caused by a process variable, the apparatus comprising means for processing the TDR signal using a primary detection method for detecting the reflection pulse generated by the process variable and for calculating a primary output result, for processing the TDR signal using at least one secondary method for detecting the reflection pulse generated by the process variable and for calculating at least one secondary output result, for comparing the primary result to the at least one secondary result to check the primary result, and for selecting the valid output result based on the comparison.

24. The apparatus of claim 23, wherein the comparing means includes means for applying a weighted factor to the primary result and each of the secondary results.

* * * * *